US009698430B2

(12) United States Patent
Nakashima et al.

(10) Patent No.: US 9,698,430 B2
(45) Date of Patent: Jul. 4, 2017

(54) LITHIUM-LANTHANUM-TITANIUM OXIDE SINTERED MATERIAL, SOLID ELECTROLYTE CONTAINING THE OXIDE, LITHIUM AIR BATTERY AND ALL-SOLID LITHIUM BATTERY INCLUDING THE SOLID ELECTROLYTE, AND METHOD FOR PRODUCING THE LITHIUM-LANTHANUM-TITANIUM OXIDE SINTERED MATERIAL

(71) Applicants: TOHO TITANIUM CO., LTD., Chigasaki-shi, Kanagawa (JP); NAKASHIMA SANGYO CO., LTD., Aichi (JP); THE GAKUSHUIN SCHOOL CORPORATION, Tokyo (JP)

(72) Inventors: Mamoru Nakashima, Yokohama (JP); Yoshiyuki Inaguma, Tokyo (JP); Mikio Nakashima, Owariasahi (JP)

(73) Assignees: TOHO TITANIUM CO., LTD., Kanagawa (JP); NAKASHIMA SANGYO CO., LTD., Aichi (JP); THE GAKUSHUIN SCHOOL CORPORATION, Tokyo (JP)

( * ) Notice: Subject to any disclaimer, the term of this patent is extended or adjusted under 35 U.S.C. 154(b) by 0 days.

(21) Appl. No.: 14/416,655

(22) PCT Filed: Jul. 12, 2013

(86) PCT No.: PCT/JP2013/069183
§ 371 (c)(1),
(2) Date: Jan. 23, 2015

(87) PCT Pub. No.: WO2014/017322
PCT Pub. Date: Jan. 30, 2014

(65) Prior Publication Data
US 2015/0180050 A1 Jun. 25, 2015

(30) Foreign Application Priority Data

Jul. 27, 2012 (JP) .................... 2012-167627
Jul. 27, 2012 (JP) .................... 2012-167656

(51) Int. Cl.
*H01M 6/18* (2006.01)
*H01M 12/06* (2006.01)
(Continued)

(52) U.S. Cl.
CPC .......... *H01M 6/186* (2013.01); *C04B 35/462* (2013.01); *C04B 35/47* (2013.01); *C04B 35/499* (2013.01); *C04B 35/6261* (2013.01); *C04B 35/62655* (2013.01); *C04B 35/62675* (2013.01); *C04B 35/634* (2013.01); *H01M 6/185* (2013.01); *H01M 6/187* (2013.01); *H01M 6/188* (2013.01); *H01M 8/1016* (2013.01); *H01M 10/052* (2013.01); *H01M 10/0525* (2013.01); *H01M 10/0562* (2013.01); *H01M 12/06* (2013.01); *H01M 12/08* (2013.01); *C04B 2235/3203* (2013.01); *C04B 2235/3213* (2013.01); *C04B 2235/3217* (2013.01); *C04B 2235/3227* (2013.01); *C04B 2235/3232* (2013.01); *C04B 2235/3251* (2013.01);
(Continued)

(58) Field of Classification Search
CPC .......... H01M 10/052; H01M 10/0525; H01M 10/0562; H01M 12/06; H01M 12/08; H01M 2220/10; H01M 2220/20; H01M 2220/30; H01M 2250/10; H01M 2250/20
See application file for complete search history.

(56) References Cited

U.S. PATENT DOCUMENTS

2011/0121226 A1* 5/2011 Awano ................ C01G 23/005
252/182.1
2011/0281168 A1* 11/2011 Watanabe ............. H01M 4/525
429/223
(Continued)

FOREIGN PATENT DOCUMENTS

JP 06-333577 12/1994
JP 07-169456 7/1995
(Continued)

OTHER PUBLICATIONS

U.S. Appl. No. 13/934,374, filed Jul. 2013, Lee, Jae-myung.*
Yashima et al., Crystal Structure and Diffusion Path in the Fast Lithium-Ion Conductor $La_{0.62}Li_{0.16}TiO_3$, J. Am. Chem. Soc., vol. 127, No. 10, Mar. 16, 2005, pp. 3491-3495.
Inaguma et al., Synthesis and Lithium Ion Conductivity of Cubic Deficient Perovskites $Sr_{0.5+x}Li_{0.5-2x\square x}Ti_{0.5}Ta_{0.5}O_3$ and the La-Doped Compounds, Solid State Ionics, vol. 174, 2004, pp. 19-26.
Vijayakumar et al., Synethesis of Fine Powders of $Li_{3x}La_{frax;2;3-x}TiO_3$ Perovskite by a Polymerizable Precursor Method, Chem. Mater, vol. 16, 2004, p. 2719-2724.
(Continued)

*Primary Examiner* — Patrick Ryan
*Assistant Examiner* — Christopher Domone
(74) *Attorney, Agent, or Firm* — Fitch, Even, Tabin & Flannery LLP

(57) ABSTRACT

A lithium-lanthanum-titanium oxide sintered material has a lithium ion conductivity $3.0\times10^{-4}$ Scm$^{-1}$ or more at a measuring temperature of 27° C., the material is described by one of general formulas $(1-a)La_xLi_{2-3x}TiO_3$-$aSrTiO_3$, $(1-a)La_xLi_{2-3x}TiO_3$-$aLa_{0.5}K_{0.5}TiO_3$, $La_xLi_{2-3x}Ti_{1-a}M_aO_{3-a}$, and $Sr_{x-1.5a}La_aLi_{1.5-2x}Ti_{0.5}Ta_{0.5}O_3$ ($0.55\leq x\leq0.59$, $0\leq a\leq0.2$, M=at least one of Al, Fe and Ga), and concentration of S is 1500 ppm or less. The material is obtained by sintering raw material powder mixture having S content amount of 2000 ppm or less in the entirety of raw material powders for mixture, that is, titanium raw material, lithium raw material, and lanthanum raw material.

12 Claims, No Drawings

(51) Int. Cl.
| | |
|---|---|
| H01M 10/0525 | (2010.01) |
| H01M 10/0562 | (2010.01) |
| H01M 8/10 | (2016.01) |
| H01M 12/08 | (2006.01) |
| C04B 35/462 | (2006.01) |
| C04B 35/47 | (2006.01) |
| C04B 35/499 | (2006.01) |
| C04B 35/626 | (2006.01) |
| C04B 35/634 | (2006.01) |
| H01M 8/1016 | (2016.01) |
| H01M 10/052 | (2010.01) |

(52) U.S. Cl.
CPC ............... C04B 2235/3272 (2013.01); C04B 2235/3286 (2013.01); C04B 2235/442 (2013.01); C04B 2235/444 (2013.01); C04B 2235/604 (2013.01); C04B 2235/6021 (2013.01); C04B 2235/6025 (2013.01); C04B 2235/6027 (2013.01); C04B 2235/661 (2013.01); C04B 2235/726 (2013.01); C04B 2235/77 (2013.01); H01M 2220/10 (2013.01); H01M 2220/20 (2013.01); H01M 2220/30 (2013.01); H01M 2250/10 (2013.01); H01M 2250/20 (2013.01); H01M 2250/30 (2013.01); H01M 2300/0071 (2013.01); Y02E 60/128 (2013.01)

(56) References Cited

U.S. PATENT DOCUMENTS

| | | | | |
|---|---|---|---|---|
| 2011/0318650 | A1* | 12/2011 | Zhang | H01M 10/0562 429/320 |
| 2012/0088157 | A1* | 4/2012 | Kawakami | H01M 4/133 429/221 |
| 2013/0189588 | A1* | 7/2013 | Yada | H01M 10/0562 429/305 |

FOREIGN PATENT DOCUMENTS

| | | |
|---|---|---|
| JP | 2008-112661 A | 5/2008 |
| JP | 2010-262876 A | 11/2010 |
| JP | 2011-134628 A | 7/2011 |
| JP | 2011-222415 A | 11/2011 |

OTHER PUBLICATIONS

Varez et al., Structural Modifications Induced by High-Temperature Quenching Treatments in the Fast Ion Conductor $Li_{0.18}La_{0.61}TiO_3$: A Neutron Diffraction Study, Chem. Mater, vol. 15, 2003, p. 4637-4641.
Katsumata et al., Anomaly of Temperature Dependence of Dielectric Permittivity for Perovskite-type Oxides, $La_{0.53}Na_{0.41-x}Li_xTiO_3$, vol. 154-155, 2002, pp. 795-799.
Katsumata et al., Influence of Covalent Character on High Li Ion Conductivity in a Perovskite-Type Li Ion Conductor: Prediction from a Molecular Dynamics Simulation of $La_{0.6}Li_{0.2}TiO_3$, vol. 14, 2002, p. 3930-3936.
Inaguma et al., Crystal Structure of a Lithium Ion-Conducting Perovskite $La_{frax;2;3-x}Li_{3x}TiO_3$ (x=0.05), J. Solid State Chemistry, vol. 166, 2002, p. 67-72.
Kunugi et al., Investigation of Isotope Effect of Lithium Ion Conductivity in (La, Li) $TiO_3$ Single Crystal, Electrochemical and Solid-State Letters, vol. 5, No. 6, 2002, p. A131-A134.
Katsumata et al., Molecular Dynamics Simulation of the High Lithium Ion Conductor, $La_{0.6}Li_{0.2}TiO_3$, Journal of Ceramic Society of Japan, vol. 107, 1999, p. 615-621.
Kunugi et al., Electrochemical Recovery and Isotope Separation of Lithium Ion Employing Lithium Ion Conductive Perovskite-type Oxides, Solid State Ionics 122, 1999, p. 35-39.
Inaguma et al., Lithium Ion Conductivity in a Perovskite Lanthanum Lithium Titanate Single Crystal, Journal of Ceramic Society of Japan, vol. 105, No. 6, Feb. 17, 1997, p. 548-550.
Inaguma et al., Influences of Carrier Concentration and Site Percolation on Lithium Ion Conductivity in Perovskite-type Oxides, Solid State Ionics, 1996, p. 257-260.
Katsumata et al., Influence of Site Percolation and Local Distortion on Lithium Ion Conductivity in Perovskite-type Oxides $La_{0.55}Li_{0.35-x}K_xTiO_3$ and $La_{0.55}Li_{0.35}TiO_3$-$KMO_3$ (M=Nb and Ta), Solid State Ionics, vol. 86-88, 1996, p. 165-169.
Shan et al., Oxide Cathode with Perovskite Structure for Rechargeable Lithium Secondary Batteries, Journal of Power Sources, 1995, vol. 54, p. 397-402.
Inaguma et al.,The Effect of the Hydrostatic Pressure on the Ionic Conductivity in a Perovskite Lanthanum Lithium Titanate, J. Electrochem Soc. vol. 142, No. 1, Jan. 1995, p. L8-L11.
Oguni et al., Calorimetric and Electrical Studies on the Positional Disorder of Lithium Ions in Lithium Lanthanum Titanate, Solid State Communications, vol. 91, No. 8, 1994, p. 627-630.
Itoh et al., High Lithium Ion Conductivity in the Perovskite-type Compounds $Ln_{frax;1;2}Li_{frax;1;2}TiO_3$ (Ln=La,Pr, Nd, Sm), Solid State Ionics vol. 70-71, 1994, p. 203-207.
Inaguma et al.,Candidate Compounds with Perovskite Structure for High Lithium Ionic Conductivity, Solid State Ionics, Vo. 70-71, 1994, p. 196-202.
Y. Inaguma et al., Predominant Factors of Lithium Ion Conductivity in Perovskite-Type Oxides, Materials Research Society, 1997, pp. 623-627, vol. 453.
Yoshiyuki Inaguma et al., A rechargeable lithium-air battery using a lithium ion-conducting lanthanum lithium titanate ceramics as an electrolyte separator, Journal of Power Sources 228, 2013, pp. 250-255.
Takashi Uchida et al., High Ionic Conductivity in Lithium Lanthanum Titanate, Solid State Communications, 1993, pp. 689-693, vol. 86, No. 10.
Ao Mei et al., Enhanced ionic transport in lithium lanthanum titanium oxide solid state electrolyte by introducing silica, Solid State Ionics 179, 2008, pp. 2255-2259.
Inaguma et al., A rechargeable lithium-air battery using a lithium ion-conducting lanthanum lithium titanate ceramics as an electrolyte separator, J. of Power Sources, 2013 (received on Aug. 30, 2012), vol. 228, pp. 250-255.

* cited by examiner

LITHIUM-LANTHANUM-TITANIUM OXIDE SINTERED MATERIAL, SOLID ELECTROLYTE CONTAINING THE OXIDE, LITHIUM AIR BATTERY AND ALL-SOLID LITHIUM BATTERY INCLUDING THE SOLID ELECTROLYTE, AND METHOD FOR PRODUCING THE LITHIUM-LANTHANUM-TITANIUM OXIDE SINTERED MATERIAL

TECHNICAL FIELD

The present invention relates to lithium-lanthanum-titanium oxide sintered material and a method for producing the same that can be used as a solid electrolyte for a lithium primary battery and a lithium secondary battery, for example, a solid electrolyte for an all-solid lithium ion battery and a solid electrolyte for a lithium air battery.

BACKGROUND ART

Recently, accompanied by rapid spreading of information devices and communication devices, such as personal computers, video cameras and cell phones, development of batteries for power supply thereof has become more important. Furthermore, also in the field of vehicles, development of batteries having high output and high capacity for electric cars and hybrid cars has been promoted. Among several kinds of batteries used therefor, attention is focused on lithium ion secondary batteries because they have high energy density and output. A typical lithium ion secondary battery is formed by a cathode active material layer, an anode active material layer, and an electrolyte between the cathode and anode active material layers.

On the other hand, attention is also focused on air batteries as a secondary battery having high capacity. Japanese Unexamined Patent Application Publication No. 2011-134628 discloses a lithium air battery in which water-soluble electrolytic solution is used at the air electrode side. This lithium air battery consists of an anode, an organic electrolytic solution for the anode, a separator of solid electrolyte, a water-soluble electrolytic solution for an air electrode, and the air electrode, in this order. A material that does not allow penetration of a water component, dissolved gas, protons ($H^+$), hydroxide ions ($OH^-$) or the like, is provided as the solid electrolyte.

Furthermore, the all-solid lithium ion battery is a lithium ion battery in which a solid electrolyte is used as the electrolyte. The all-solid lithium ion battery is a focus of attention as an alternative to commercially available lithium ion secondary batteries in which an organic electrolytic solution is used as the electrolyte, since it has no risk of electrolytic solution leakage and gas generation.

A material having high lithium ion conductivity is necessary as the solid electrolyte for the air battery and the all-solid lithium ion battery. As such material having high lithium ion conductivity, lithium-lanthanum-titanium oxides are the focus of attention (See Japanese Unexamined Patent Application Publications Nos. 2010-262876 and 2011-222415).

The document "Y. Inaguma, et al., Solid State Communications 689-693(1993) 86." discloses that lithium-lanthanum-titanium oxide is produced by using lanthanum oxide, lithium carbonate and titanium oxide, mixing them by a solid phase method, and performing heat treatment. It also discloses that lithium-lanthanum-titanium oxide produced by this method exhibits high lithium ion conductivity of $7\times10^{-5}$ $Scm^{-1}$.

Furthermore, the document "A. Mei, et al., Solid State Ionics 2255-2259 (2008) 179." discloses that lithium-lanthanum-titanium oxide sintered material having $SiO_2$ concentration of 0.58 to 2.89 mass % is produced by using lithium nitrate, lanthanum nitrate and tetrabutyltitanate as a raw material, mixing them by a liquid phase method, performing heat treatment so as to synthesize lithium-lanthanum-titanium oxide, adding tetraethyl ortho silicate, and performing heat treatment. It also discloses that lithium-lanthanum-titanium oxide sintered material produced by this method exhibits improved lithium ion conductivity up to $8.9\times10^{-5}$ $Scm^{-1}$ ($SiO_2$ concentration 2.31 mass %, a measuring temperature of 30° C.).

Furthermore, US Unexamined Patent Application Publication No. 2011/0318650 discloses that lithium-lanthanum-titanium oxide having $Al_2O_3$ concentration of 11.1 mass % is produced by using lanthanum oxide, lithium carbonate and titanium oxide, mixing them by a solid phase method, and performing heat treatment so as to synthesize lithium-lanthanum-titanium oxide, adding $Al_2O_3$, and performing heat treatment. It also discloses that lithium-lanthanum-titanium oxide sintered material produced by this method exhibits improved lithium ion conductivity up to $9.33\times10^{-4}$ $Scm^{-1}$ at the inside of a particle and $2.38\times10^{-5}$ $Scm^{-1}$ at an interface between particles (a measuring temperature of 30° C.).

From the viewpoint of increasing output of a battery, a solid electrolyte material having high lithium ion conductivity is required. An object of the present invention is to provide a lithium-lanthanum-titanium oxide sintered material having lithium ion conductivity of $3.0\times10^{-4}$ $Scm^{-1}$ or more at a measuring temperature of 27° C. as the solid electrolyte material, and a method for producing the same.

SUMMARY OF THE INVENTION

As a result of research by the inventors, they finally succeeded in obtaining lithium-lanthanum-titanium oxide sintered material having a lithium ion conductivity $3.0\times10^{-4}$ $Scm^{-1}$ or more at a measuring temperature of 27° C., by reducing S to less than a certain amount.

That is, the lithium-lanthanum-titanium oxide sintered material of the present invention is described by one of the general formulas $(1-a)La_xLi_{2-3x}TiO_3$-$aSrTiO_3$, $(1-a)La_xLi_{2-3x}TiO_3$-$aLa_{0.5}K_{0.5}TiO_3$, $La_xLi_{2-3x}Ti_{1-a}M_aO_{3-a}$, and $Sr_{x-1.5a}La_aLi_{1.5-2x}Ti_{0.5}Ta_{0.5}O_3$ ($0.55 \leq x \leq 0.59$, $0 \leq a \leq 0.2$, M=at least one of Al, Fe and Ga), and concentration of S is 1500 ppm or less. According to the present invention, the lithium-lanthanum-titanium oxide sintered material having a lithium ion conductivity $3.0\times10^{-4}$ $Scm^{-1}$ or more can be obtained, and the lithium-lanthanum-titanium oxide sintered material can be used as a raw material of the solid electrolyte. Therefore, it can be used as the solid electrolyte of lithium air battery and the all-solid lithium battery.

Furthermore, the solid electrolyte of the present invention contains the lithium-lanthanum-titanium oxide sintered material.

Furthermore, the lithium air battery of the present invention contains the lithium-lanthanum-titanium oxide sintered material as the solid electrolyte.

Furthermore, the all-solid lithium ion battery of the present invention contains the lithium-lanthanum-titanium oxide sintered material as the solid electrolyte.

Furthermore, the method for producing the lithium-lanthanum-titanium oxide sintered material includes a mixing process in which titanium raw material, lithium raw material, and lanthanum raw material are pulverized and mixed, a provisional baking process in which the powder mixture obtained in the mixing process is provisionally baked, a pulverizing process in which the provisional baked body in the provisional baking process is pulverized, a forming process in which the powder obtained in the pulverizing process is formed, and a sintering process in which the formed body obtained in the forming process is sintered, in which content amount of S in the entirety of the powder mixture is 2000 ppm or less.

According to the lithium-lanthanum-titanium oxide sintered material of the present invention, lithium-lanthanum-titanium oxide sintered material having a lithium ion conductivity of $3.0 \times 10^{-4}$ Scm$^{-1}$ or more that is appropriate for the solid electrolyte material for air battery and all-solid lithium ion battery, can be obtained.

Furthermore, according to the method for producing of the present invention, by limiting the content amount of S in the entirety of the powder mixture to the amount as mentioned above, lithium-lanthanum-titanium oxide sintered material having a lithium ion conductivity of $3.0 \times 10^{-4}$ Scm$^{-1}$ or more at measuring temperature 27° C. that is appropriate for the solid electrolyte material for air battery and all-solid lithium ion battery, can be obtained.

MODE FOR CARRYING OUT THE INVENTION

The lithium-lanthanum-titanium oxide sintered material produced by the method for production of lithium-lanthanum-titanium oxide sintered material of the present invention is a solid electrolyte material that is described by one of general formulas $La_{x-a}M^1_a Li_{2-3x}Ti_{1-b}M^2_b O_3$, $La_x Li_{2-3x-a} M^1_a Ti_{1-b}M^2_b O_3$, $(La_x Li_{2-3x})_{1-a}M^1_a Li_{2-3x}Ti_{1-b}M^2_b O_3$, $La_{x-a}M^1_a Li_{2-3x}TiO_{3-2a}$, $La_{x-a}M^1_a Li_{2-3x}TiO_{3-a}$, $La_x Li_{2-3x}Ti_{1-b}M^2_b O_{3-3b}$, $La_x Li_{2-3x}Ti_{1-b}M^2_b O_{3-2b}$, $La_x Li_{2-3x}Ti_{1-b}M^2_b O_{3-b}$ ($0.55 \leq x \leq 0.59$, $0 \leq a \leq 0.5$, $0 \leq b \leq 0.5$, $M^1$=at least one of Na, K, Ca, Ba, Pb, Sr, Pr, Nd, Sm, Gd, Dy, Y, Eu, Tb, Ce, Ag, Bi, and $M^2$=at least one of Mg, Co, Ni, Cu, Cr, Fe, Ga, Gd, In, Sc, Ge, Hf, Mn, Pr, Sn, Tb, Zn, Zr, W, Ru, Nb, Ta, Al, and Y), and in which concentration of S is 1500 ppm or less. By setting in the above range, the lithium-lanthanum-titanium oxide sintered material having lithium ion conductivity of $3.0 \times 10^{-4}$ Scm$^{-1}$ or more at a measuring temperature of 27° C. can be obtained.

Here, in the present invention, desirably, the lithium-lanthanum-titanium oxide sintered material has x=0.57, a≤0.05 in the above composition formula. By setting in the range, the lithium-lanthanum-titanium oxide sintered material having lithium ion conductivity $4.0 \times 10^{-4}$ Scm$^{-1}$ or more at a measuring temperature of 27° C. can be obtained.

Furthermore, in the present invention, it is desirable that the lithium-lanthanum-titanium oxide sintered material is described by one of the general formulas $(1-a)La_x Li_{2-3x}TiO_3$-$aSrTiO_3$, $(1-a)La_x Li_{2-3x}TiO_3$-$aLa_{0.5}K_{0.5}TiO_3$, $La_x Li_{2-3x}Ti_{1-a}M_a O_{3-a}$, and $Sr_{x-1.5a}La_a Li_{1.5-2x}Ti_{0.5}Ta_{0.5}O_3$ ($0.55 \leq x \leq 0.59$, $0 \leq a \leq 0.2$, M=at least one of Al, Fe and Ga), and that concentration of S is 1500 ppm or less.

S concentration of the lithium-lanthanum-titanium oxide sintered material of the present invention can be measured by a wavelength-dispersive fluorescent X-ray spectrometer.

The composition (x, a) of the lithium-lanthanum-titanium oxide sintered material of the present invention is determined by the following method. The lithium-lanthanum-titanium oxide, $Na_2O_2$ and NaOH are placed in a zirconium crucible, and then they are heated and melted. After that, it is left to cool and is dissolved by adding water and HCl. The liquid part that dissolved is collected, and quantitative determination is performed by an aluminum reduction—ammonium iron sulfate (III) titration method for Ti, and by an ICP emission spectroscopy for the other elements.

Lithium ion conductivity of lithium-lanthanum-titanium oxide sintered material of the present invention is measured as follows. A surface of a sample of lithium-lanthanum-titanium oxide sintered material in tabular shape (15 mm×15 mm×2.5 mm) is polished by a diamond grinding stone of #150 and is finished by diamond grinding stone of #600. 1M lithium chloride water solution is absorbed in two sheets of filtering paper that are cut in a size of 10 mm×10 mm, and the tabular lithium-lanthanum-titanium oxide is adhered between the sheets. A Cole-Cole plot was measured by using an impedance analyzer in measuring frequency 5 to 13 MHz and a measuring temperature of 27° C., and resistance value inside of the particle and at a particle interface is read based on the data measured. Lithium ion conductivity is calculated by the following formula.

$$\text{Lithium ion conductivity (Scm}^{-1}) = 1/(R_b + R_{gb}) \times (L/S)$$

$R_b$: resistance inside of particle ($\Omega$)
$R_{gb}$: resistance at interface of particle ($\Omega$)
L: thickness of tabular lithium-lanthanum-titanium oxide (cm)
S: area of electrode (cm$^2$)

Furthermore, lithium-lanthanum-titanium oxide sintered material of the present invention is desirably a sintered body of lithium-lanthanum-titanium oxide having a single phase ratio of 90% or more. It should be noted that the single phase ratio is defined as follows. Lithium-lanthanum-titanium oxide sintered material is pulverized in an alumina mortar to prepare a measuring sample, and the sample is measured using a powder X ray diffractometer (X ray source: CuKα ray). The single phase ratio is calculated by the formula below based on the heights of main peaks nf lithium-lanthanum-titanium oxide and impurities from the diffraction pattern obtained.

$$\text{Single phase ratio (\%)} = I/(I+S) \times 100$$

I: height of the strongest peak of lithium-lanthanum-titanium oxide in 2θ=0 to 50°
S: sum of heights of main peaks of all impurities It should be noted that $TiO_2$, $La_2O_3$, $Li_2Ti_3O_7$, $La_2Ti_2O_7$ or the like can be mentioned as the impurities.

In the present invention, although the reasons for improving lithium ion conductivity are uncertain, they can be assumed to be as follows. S compound contained in lithium-lanthanum-titanium oxide sintered material is thought to deposit at the particle interface and is thought to inhibit lithium ion conductivity. The S concentration is reduced to 1500 ppm or less, and amount of S compounds depositing at the particle interface are reduced. As a result, lithium-lanthanum-titanium oxide sintered material having a lithium ion conductivity of $3.0 \times 10^{-4}$ Scm$^{-1}$ or more is thought to be obtainable.

In the method for producing lithium-lanthanum-titanium oxide sintered material of the present invention, a titanium compound such as titanium oxide, titanium hydroxide, metatitanic acid, orthotitanic acid or the like, or mixture thereof as a titanium raw material, a lithium compound such as lithium hydroxide, lithium carbonate or the like as a lithium raw material, and a lanthanum compound such as lanthanum oxide, lanthanum carbonate or lanthanum hydroxide as a lanthanum raw material can be used. In particular, titanium oxide is desirable since it is the most inexpensive among the titanium raw materials.

Raw materials for other elements (Na, K, Ca, Ba, Pb, Sr, Pr, Nd, Sm, Gd, Dy, Y, Eu, Tb, Ce, Ag, Bi, Mg, Co, Ni, Cu, Cr, Fe, Ga, Gd, In, Sc, Ge, Hf, Mn, Pr, Sn, Tb, Zn, Zr, W, Ru, Nb, Ta, Al, Y) are prepared by using an oxide, hydroxide, chloride, carbonate or the like thereof.

Each raw material is of a weight depending on the required mole ratio. It should be noted that with respect to the lithium raw material, in view of vaporizing of lithium compound during provisional baking and final sintering, lithium raw material in an excess amount of 0 to 15 mass % of the lithium raw material is added.

Raw materials weighed are mixed by a conventional method. For example, a mixing device such as a container rotating type mixer (horizontal cylinder, inclining cylinder, V type or the like), a mechanical stirring type mixer (ribbon, screw, rod or the like) or the like, a mixing pulverizing device such as a medium flowing type mixing and pulverizing device (ball mill, planetary mill or the like), a stirring type mixing and pulverizing device (tower type pulverizer, stirring vessel type mill, flowing tube type mill or the like), a mortar (agate mortar, alumina mortar, stone mill device, or the like), or the like can be used. In a case in which the mixing and pulverizing device, a dry type mixing method and a wet type mixing method can be selected. In the wet type, water, organic solvent (alcohol, toluene, hexane, heptane, acetone or the like) and the like can be used as a dispersing medium, and a dispersing medium mixture of pure water and ethanol is particularly desirable. Furthermore, pulverization is performed adding dispersing medium such as a surfactant or the like if necessary. The powder mixture which is pulverized by a ball mill is continuously dried so as to obtain primary dried powder. In this process, each raw material is selected so that total concentration of S contained in the powder mixture (the primary dried powder) is 2000 ppm or less. Therefore, lithium ion conductivity of $3.0 \times 10^{-4}$ Scm$^{-1}$ or more at a measuring temperature of 27° C. can be realized. In particular, it is desirable to select titanium raw material having S content amount of 3500 ppm or less, and titanium oxide obtained by a gas phase oxidation of titanium chloride is more desirable.

A method for drying is not limited, in particular, and for example, a spray dryer drying machine, a fluidized layer drying machine, a rolling granulating drying machine, a freezing drying machine, or a hot air drying machine may be mentioned. Drying conditions under the spray dryer is 200 to 250° C. at an inlet of hot air, and 90 to 120° C. at exhaust of the air.

It should be noted that S concentration of the raw material powder mixture and titanium compound in the method for producing lithium-lanthanum-titanium oxide sintered material of the present invention is measured by a wavelength-dispersive fluorescent X-ray spectrometer.

Next, provisional baking of the raw material powder mixture having S content amount of 2000 ppm or less is performed, so as to obtain provisional baked powder. Provisional baking conditions are 1000 to 1200° C. under an atmosphere of oxygen, air, or inert gas atmosphere (nitrogen gas, argon gas or the like) for 1 to 12 hours.

The provisional baked powder obtained can be put in ball mill to perform pulverization if necessary. Pulverization is performed with adding a mixed solvent of pure water and alcohol (ethanol for example) as a dispersing medium, and adding another dispersing medium such as a surfactant, if necessary. Time for pulverization is 1 to 6 hours. Urethane lining ball mill, nylon ball mill, or natural rubber lining ball mill can be used as the pulverizing device.

Then, the provisionally baked powder is formed. It is processed in a desired shape by a forming method such as CIP forming, mold forming, casting forming, extrusion forming, and green sheet casing forming, so as to obtain a formed material. Forming conditions when employing the mold forming is forming pressure of 400 to 1500 kg/cm$^2$, for example. Furthermore, like in the spray dryer drying, it can be dried and formed in granular shape at the same time. It should be noted that powder that is dried by the spray dryer drying can be used for forming process.

The formed material obtained is sintered so as to obtain lithium-lanthanum-titanium oxide of the present invention. After performing primary sintering at 1000 to 1200° C. for 1 to 4 hours, secondary sintering is performed at 1200 to 1500° C. for 4 to 20 hours.

The lithium-lanthanum-titanium oxide sintered material obtained by the method for producing of the present invention can be desirably applied to solid electrolyte layer or the like of an all-solid lithium ion battery including a cathode active material layer containing cathode active material, an anode active material layer containing anode active material and the solid electrolyte layer between the cathode active material layer and the anode active material layer; or an air battery including an anode active material layer, the solid electrolyte and a cathode active material layer in which electrolytic solution is contained between the anode active material layer and the solid electrolyte, and between the cathode active material layer and the solid electrolyte.

All-Solid Lithium Ion Battery

The all-solid lithium ion battery of the present invention includes a cathode active material layer containing a cathode active material, an anode active material layer containing an anode active material, and a solid electrolyte layer comprising of lithium-lanthanum-titanium oxide sintered material of the present invention arranged between the cathode active material layer and the anode active material layer.

(Cathode Active Material Layer)

The cathode active material layer comprises of a cathode active material such as $LiCoO_2$, $LiMnO_2$, $LiNiMn_3O_8$, $LiVO_2$, $LiCrO_2$, $LiFePO_4$, $LiCoPO_4$, $LiNiO_2$ and $LiNi_{1/3}CO_{1/3}Mn_{1/3}O_2$ for example, and if necessary, a conductive material and a binding material. As the conductive material, acetylene black, Ketchen black, carbon fiber or the like can be mentioned. As the binding material, fluorine-containing binder, such as polytetrafluoroethylene (PTFE) or the like, can be mentioned.

(Anode Active Material Layer)

The anode active material layer comprises of an anode active material such as a metal, carbon, ceramic or the like, a conductive material, and a binding material. For example, as a metallic active material, lithium and alloy containing lithium metal can be mentioned. As a carbon active material, for example, meso carbon micro beads (MCMB), highly orientated pyrolytic graphite (HOPG), hard carbon, soft carbon, and the like, can be mentioned. Furthermore, as a ceramic active material, $Li_4Ti_5O_{12}$ can be mentioned. The conductive material, the solid electrolyte material and the binding material similar to the cathode active material layer can be used.

(Other Components)

The all-solid lithium ion battery of the present invention can include a cathode collector that can collect electricity from the cathode active material layer and an anode collector that can collect electricity from the anode active material layer. The material of the cathode collector is not limited in particular, as long as it can withstand the environment in which it is to be used. For example, as the material of the cathode collector, stainless steel, aluminum, nickel, iron, titanium or the like, alloys containing at least one of these metals, and carbon, can be mentioned. As the material of the anode collector, stainless steel, copper, nickel, alloys containing at least one of these metals, and carbon, can be mentioned.

Air Battery

The air battery of the present invention includes an anode active material layer, a solid electrolyte comprising of lithium-lanthanum-titanium oxide sintered material of the present invention, and a cathode active material layer, and the electrolytic solution is arranged between the anode active material layer and the solid electrolyte and between the cathode active material layer and the solid electrolyte.

(Cathode Active Material Layer)

As the cathode active material layer, the formation is not limited in particular as long as it functions as a cathode of the air battery, and a known construction can be mentioned. For example, a complex oxide which is porous, conductive, and permeable to gas and does not contain carbon, for example, lanthanum-strontium-manganese type complex oxide, lanthanum-strontium-cobalt type complex oxide, lanthanum-strontium-copper type complex oxide, lanthanum-calcium-manganese type complex oxide, lanthanum-calcium-cobalt type complex oxide, lanthanum-calcium-copper type complex oxide, lanthanum-barium-manganese type complex oxide, lanthanum-barium-cobalt type complex oxide, lanthanum-barium-copper type complex oxide, and the like, can be mentioned.

(Anode Active Material Layer)

The anode active material layer contains anode active material that can emit lithium ions, or desirably, can contain and emit lithium ions. As the anode active material, metallic active material such as lithium, alloy containing lithium, and $Li_4Ti_5O_{12}$ and the like can be mentioned.

(Electrolytic Solution Between Anode Active Material Layer and Solid Electrolyte)

Electrolytic solution comprises of electrolyte and solvent. The electrolyte is not limited in particular as long as it forms lithium ions in the solvent. For example, $LiPF_6$, $LiClO_4$, $LiBF_4$, $LiAsF_6$, $LiAlCl_4$, $LiCF_3SO_3$, $LiSbF_6$ or the like can be mentioned. These electrolytes can be used alone or in combination. Furthermore, as the solvent, for example, propylene carbonate, tetrahydrofuran, dimethylsulfoxide, γ-butylolactone, 1,3-dioxolane, 4-methyl-1,3-dioxolane, 1,2-dimethoxyethane, 2-methyltetrahydrofuran, sulfolane, diethylcarbonate, dimethylformamide, acetonitrile, dimethylcarbonate, ethylenecarbonate or the like can be mentioned. These solvents can be used alone or in combination.

(Electrolytic Solution Between Cathode Active Material Layer and Solid Electrolyte)

As the electrolytic solution between the cathode active material layer and the solid electrolyte, water type electrolyte solution or organic electrolyte solution, which is used in a typical air battery, can be used. For example, LiOH water solution may be mentioned.

(Other Components)

The air battery according to the present invention typically includes a cathode collector that collects electricity of the cathode active material layer and an anode collector that collects electricity of the anode active material layer. The material of the collector is not limited in particular as long as it can withstand the environment during use of the air battery. As the material of the cathode collector, for example, metal such as manganese, cobalt, nickel, ruthenium, rhodium, silver, iridium, platinum, gold, stainless steel, aluminum, iron, titanium or the like, alloy containing at least one of these metals, and carbon or the like can be mentioned. On the other hand, as the material of the anode collector, for example, metal such as platinum, gold, stainless steel, copper, nickel or the like, alloy containing at least one of these metals, carbon or the like can be mentioned.

The above-mentioned all-solid lithium ion battery and the air battery can be used in a device that travels, a stationary system device, or a backup power source device. As the device that travels, for example, a vehicle, forklift, construction machine, motorcycle, bicycle, robot, airplane, ship, train, artificial satellite or the like can be mentioned. As the stationary system device, for example, a water power generation system, fire power generation system, atomic powder generation system, solar light power generation system, wind power generation system, geothermal power generation system, tidal power (ocean current, wave power) generation system or the like can be mentioned. As the backup power source system device, for example, emergency power system device or the like for a construction (public facility, commercial facility, factory, hospital, residence or the like) can be mentioned.

EXAMPLES

Hereinafter, the present invention is further explained by way of Examples, which are merely exemplifications, and the present invention is not limited to these Examples.

1. Evaluating Method of Lithium-Lanthanum-Titanium Oxide Sintered Material (Determining Method of x and a in Composition Formula)

A lithium-lanthanum-titanium oxide sintered material, $Na_2O_2$ and NaOH were put in a zirconium crucible, heated, and melted. This was allowed to stand to cool and was dissolved by adding water and HCl. The dissolved liquid part was collected. Ti was quantified by an aluminum reduction-ammonium iron sulfate (III) titration method and the other elements were quantified by ICP emission spectrometry, the value of x and a were determined in general formulas $(1-a)La_xLi_{2-3x}TiO_3-aSrTiO_3$, $(1-a)La_xLi_{2-3x}TiO_3-aLa_{0.5}K_{0.5}TiO_3$, $La_xLi_{2-3x}Ti_{1-a}M_aO_{3-a}$, and $Sr_{x-1.5a}La_aLi_{1.5-2x}Ti_{0.5}Ta_{0.5}O_3$ ($0.55 \leq x \leq 0.59$, $0 \leq a \leq 0.2$, M=at least one of Al, Fe and Ga).

(Quantification Method S)

Tabular lithium-lanthanum-titanium oxide sintered material obtained was directly placed in a cell for analysis, and qualitative and quantitative analyses of surface of the sample were performed by a wavelength dispersing type fluorescent X ray device (trade name: LIX3000 produced by Rigaku Corporation), so as to calculate concentration of S.

(Measuring Method of Lithium Ion Conductivity)

A surface of sample of tabular (15 mm×15 mm×2.5 mm) lithium-lanthanum-titanium oxide sintered material was ground by a diamond grinding stone of #150, and polished by a diamond grinding stone of #600 to finish. 1M lithium chloride water solution was absorbed in two sheets of filter paper cut in a size of 10 mm×10 mm, and the tabular lithium-lanthanum-titanium oxide sintered material was adhered between the two sheets. A Cole-Cole plot was measured by using an impedance analyzer (trade name: 4192A produced by Hewlett Packard Co.) at a measuring frequency 5 Hz to 13 MHz and a measuring temperature of 27° C., and resistance values inside of a particle and at a particle interface was read based on the data measured.

Lithium ion conductivity was calculated by the following formula.

Lithium ion conductivity $(Scm^{-1})=1/(R_b+R_{gb})\times(L/S)$ $R_b$: resistance inside of particle ($\Omega$)
$R_{gb}$: resistance at interface of particle ($\Omega$)
L: thickness of tabular lithium-lanthanum-titanium oxide (cm)
S: area of electrode (cm$^2$)

(Measuring Method of Single Phase Ratio)

The lithium-lanthanum-titanium oxide sintered material obtained was pulverized in an alumina mortar to prepare a measuring sample, and the sample was measured using an X ray diffractometer (X ray source: CuKα ray, trade name: X' Part-ProMPD, produced by PANalytical B. V.). Single phase ratio was calculated by the formula below based on heights of the main peaks of lithium-lanthanum-titanium oxide and impurities from the diffraction pattern obtained.

Single phase ratio $(\%)=I/(I+S)\times100$

I: height of the strongest peak of lithium-lanthanum-titanium oxide in 2θ=0 to 50°
S: sum of heights of main peaks of all the impurities Example 1

1. Raw Material

As raw materials, lithium carbonate (produced by Sociedad Quimica y Minera de Chile S. A., purity: 99.2% or more), lanthanum oxide (produced by Yixing Xinwei Leeshing Rare Earth Co., Ltd, purity: 99.99% or more), and titanium oxide which was obtained by performing gas phase oxidization of titanium tetrachloride (produced by TOHO TITANIUM CO., LTD., purity: 99.99% or more, sulfur concentration: 570 ppm) were prepared. The weight of each raw material is shown in Table 1. The amount of lithium carbonate added was 7.5 mass % in excess.

2. Primary Pulverization

The raw materials weighed, 200 kg of alumina media (diameter: 3 mm), 35 L of ion exchanged water and 35 L of ethanol were placed in a urethane lining ball mill (capacity 200 L), and the raw materials were pulverized and mixed for 30 minutes. They were allowed to rest for 15 hours in the ball mill, and then, they were pulverized again for 30 minutes to obtain a primary pulverized powder (raw material powder mixture). S concentration of the raw material powder mixture is shown in Table 1.

3. Primary Drying

The primary pulverized powder was dried by a spray dryer to obtain the primary dried powder. The conditions of the spray drying were as follows.

Amount of raw material supplied: 10 to 30 L/h
Temperature at hot air inlet: 150 to 250° C.
Air exhaust temperature: 90 to 120° C.

Furthermore, S concentration of the primary dried powder is shown in Table 1.

4. Provisional Baking

The primary dried powder was put in a sagger made of cordierite mullite material, provisionally baked in an electric furnace to obtain the provisional baked powder. The conditions of provisional baking were provisional baking temperature of 1150° C., and provisional baking time of 2 hours under an atmosphere.

5. Secondary Pulverization 70 kg of the provisional baked powder, 200 kg of zirconia media (diameter 3 mm), 60 L of ion exchanged water and 700 g of dispersing agent (ammonium polyacrylate salt) were placed in a urethane lining ball mill (capacity 200 L), and the powder was pulverized for 6 hours. After that, 4.5 kg of acrylic resin type binder was placed therein, and they are mixed for 15 minutes so as to obtain the secondary pulverized powder.

6. Secondary Drying

The secondary pulverized powder was dried by spray dryer to obtain the secondary dried powder. The conditions of the spray dryer were as follows.

Amount of raw material supplied: 10 to 30 L/h
Temperature at hot air inlet: 200 to 250° C.
Air exhaust temperature: 90 to 120° C.

7. Molding 15 g of the secondary dried powder was formed into a tabular shape of 40 mm×40 mm×thickness 3 mm by a mold forming (forming pressure 1000 kg/cm$^2$), so as to obtain a molded body.

8. Sintering

Primary sintering of the molded body was performed in an electric furnace at 1100° C. for 2 hours under an atmosphere, and then, secondary sintering was performed at 1460° C. for 6 hours, so as to obtain a lithium-lanthanum-titanium oxide sintered material. Single phase ratio, S concentration, and lithium ion conductivity of the lithium-lanthanum-titanium oxide sintered material obtained are shown in Table 2.

Example 2

The lithium-lanthanum-titanium oxide sintered material was produced in a manner similar to that in Example 1, except that weight of each raw material in Example 1 was changed as shown in Table 1. Single phase ratio, S concentration, and lithium ion conductivity of the lithium-lanthanum-titanium oxide sintered material obtained are shown in Table 2.

Example 3

The lithium-lanthanum-titanium oxide sintered material was produced in a manner similar to that in Example 1, except that weight of each raw material in Example 1 was changed as shown in Table 1. Single phase ratio, S concentration, and lithium ion conductivity of the lithium-lanthanum-titanium oxide sintered material obtained are shown in Table 2.

Example 4

The lithium-lanthanum-titanium oxide sintered material was produced in a manner similar to that in Example 1, except that the weight of each raw material in Example 1 was changed as shown in Table 1, and that 3.666 kg of SrCO$_3$ was added. Single phase ratio, S concentration, and lithium ion conductivity of the lithium-lanthanum-titanium oxide sintered material obtained are shown in Table 2.

Example 5

The lithium-lanthanum-titanium oxide sintered material was produced in a manner similar to that in Example 1, except that the weight of each raw material in Example 1 was changed as shown in Table 1, and that 11.00 kg of SrCO$_3$ was added. Single phase ratio, S concentration, and lithium ion conductivity of the lithium-lanthanum-titanium oxide sintered material obtained are shown in Table 2.

Example 6

The lithium-lanthanum-titanium oxide sintered material was produced in a manner similar to that in Example 1, except that the weight of each raw material in Example 1 was changed as shown in Table 1, and that 1.884 kg of $Fe_2O_3$ was added. Single phase ratio, S concentration, and lithium ion conductivity of the lithium-lanthanum-titanium oxide sintered material obtained are shown in Table 2.

Example 7

The lithium-lanthanum-titanium oxide sintered material was produced in a manner similar to that in Example 1, except that the weight of each raw material in Example 1 was changed as shown in Table 1, and that 5.651 kg of $Fe_2O_3$ was added. Single phase ratio, S concentration, and lithium ion conductivity of the lithium-lanthanum-titanium oxide sintered material obtained are shown in Table 2.

Example 8

The lithium-lanthanum-titanium oxide sintered material was produced in a manner similar to that in Example 1, except that the weight of each raw material in Example 1 was changed as shown in Table 1, and that 36.29 kg of $SrCO_3$ and 54.86 kg of $Ta_2O_5$ were added. Single phase ratio, S concentration, and lithium ion conductivity of the lithium-lanthanum-titanium oxide sintered material obtained are shown in Table 2.

Example 9

The lithium-lanthanum-titanium oxide sintered material was produced in a manner similar to that in Example 1, except that weight of each raw material in Example 1 was changed as shown in Table 1, and that 25.30 kg of $SrCO_3$ and 54.86 kg of $Ta_2O_5$ were added. Single phase ratio, S concentration, and lithium ion conductivity of the lithium-lanthanum-titanium oxide sintered material obtained are shown in Table 2.

Example 10

The lithium-lanthanum-titanium oxide sintered material was produced in a manner similar to that in Example 1, except that titanium oxide obtained by gas phase oxidization of titanium tetrachloride (produced by TOHO TITANIUM CO., LTD., purity: 99.99% or more) in "2. Primary pulverization" was changed to titanium oxide mixture in which titanium oxide obtained by gas phase oxidization of titanium tetrachloride (produced by TOHO TITANIUM CO., LTD., purity: 99.99% or more) and titanium oxide obtained by a sulfuric acid method were mixed at 1:1. Single phase ratio, S concentration, and lithium ion conductivity of the lithium-lanthanum-titanium oxide sintered material obtained are shown in Table 2.

Comparative Example 1

The lithium-lanthanum-titanium oxide sintered material was produced in a manner similar to that in Example 1, except that titanium oxide obtained by gas phase oxidization of titanium tetrachloride (produced by TOHO TITANIUM CO., LTD., purity: 99.99% or more) in "1. Raw material" was changed to titanium oxide obtained by a sulfuric acid method (sulfur concentration: 3850 ppm). Single phase ratio, S concentration, and lithium ion conductivity of the lithium-lanthanum-titanium oxide sintered material obtained are shown in Table 2.

Comparative Example 2

The lithium-lanthanum-titanium oxide sintered material was produced in a manner similar to that in Example 1, except that 2.22 kg of $H_2SO_4$ having concentration of 20 mass % was added during performing "2. Primary pulverization". Single phase ratio, S concentration, and lithium ion conductivity of the lithium-lanthanum-titanium oxide sintered material obtained are shown in Table 2.

Comparative Example 3

The lithium-lanthanum-titanium oxide sintered material was produced in a manner similar to that in Example 1, except that weight of each raw material in Example 1 was changed as shown in Table 1. Single phase ratio, S concentration, and lithium ion conductivity of the lithium-lanthanum-titanium oxide sintered material obtained are shown in Table 2.

Comparative Example 4

The lithium-lanthanum-titanium oxide sintered material was produced in a manner similar to that in Example 1, except that weight of each raw material in Example 1 was changed as shown in Table 1. Single phase ratio, S concentration, and lithium ion conductivity of the lithium-lanthanum-titanium oxide sintered material obtained are shown in Table 2.

Comparative Example 5

The lithium-lanthanum-titanium oxide sintered material was produced in a manner similar to that in Example 5, except that titanium oxide obtained by gas phase oxidization of titanium tetrachloride (produced by TOHO TITANIUM CO., LTD., purity: 99.99% or more) in "1. Raw material" was changed to titanium oxide obtained by a sulfuric acid method. Single phase ratio, S concentration, and lithium ion conductivity of the lithium-lanthanum-titanium oxide sintered material obtained are shown in Table 2.

Comparative Example 6

The lithium-lanthanum-titanium oxide sintered material was produced in a manner similar to that in Example 7, except that titanium oxide obtained by gas phase oxidization of titanium tetrachloride (produced by TOHO TITANIUM CO., LTD., purity: 99.99% or more) in "1. Raw material" was changed to titanium oxide obtained by a sulfuric acid method. Single phase ratio, S concentration, and lithium ion conductivity of the lithium-lanthanum-titanium oxide sintered material obtained are shown in Table 2.

Comparative Example 7

The lithium-lanthanum-titanium oxide sintered material was produced in a manner similar to that in Example 9, except that titanium oxide obtained by gas phase oxidization of titanium tetrachloride (produced by TOHO TITANIUM CO., LTD., purity: 99.99% or more) in "1. Raw material" was changed to titanium oxide obtained by a sulfuric acid method. Single phase ratio, S concentration, and lithium ion conductivity of the lithium-lanthanum-titanium oxide sintered material obtained are shown in Table 2.

1, 5 and 7 in which La ratio in composition formula is 0.57 and S concentration is 300 ppm which is low value.

TABLE 1

| | Composition | $Li_2CO_3$/kg | $TiO_2$/kg | $La_2O_3$/kg | Added amount of $H_2SO_4$/kg | S concentration of powder mixture/ppm | S concentration of $TiO_2$/ppm |
|---|---|---|---|---|---|---|---|
| Example 1 | $La_{0.57}Li_{0.29}TiO_3$ | 5.321 | 36.90 | 42.90 | 0 | 500 | 570 |
| Example 2 | $La_{0.55}Li_{0.35}TiO_3$ | 6.422 | 36.90 | 41.40 | 0 | 400 | 460 |
| Example 3 | $La_{0.59}Li_{0.23}TiO_3$ | 4.220 | 36.90 | 44.41 | 0 | 500 | 580 |
| Example 4 | $0.95La_{0.57}Li_{0.29}TiO_3$—$0.05SrTiO_3$ | 5.055 | 36.90 | 40.76 | 0 | 400 | 480 |
| Example 5 | $0.85La_{0.57}Li_{0.29}TiO_3$—$0.15SrTiO_3$ | 4.523 | 36.90 | 36.47 | 0 | 500 | 570 |
| Example 6 | $La_{0.57}Li_{0.29}Ti_{0.95}Fe_{0.05}O_{2.95}$ | 5.321 | 35.06 | 42.90 | 0 | 500 | 550 |
| Example 7 | $La_{0.57}Li_{0.29}Ti_{0.85}Fe_{0.15}O_{2.85}$ | 5.321 | 31.37 | 42.90 | 0 | 400 | 520 |
| Example 8 | $Sr_{0.495}La_{0.05}Li_{0.36}Ti_{0.5}Ta_{0.5}O_3$ | 6.606 | 18.45 | 3.76 | 0 | 400 | 470 |
| Example 9 | $Sr_{0.345}La_{0.15}Li_{0.36}Ti_{0.5}Ta_{0.5}O_3$ | 6.606 | 18.45 | 11.29 | 0 | 400 | 530 |
| Example 10 | $La_{0.57}Li_{0.29}TiO_3$ | 5.321 | 36.90 | 42.90 | 0 | 1500 | 2250 |
| Comparative Example 1 | $La_{0.57}Li_{0.29}TiO_3$ | 5.321 | 36.90 | 42.90 | 0 | 2500 | 3850 |
| Comparative Example 2 | $La_{0.57}Li_{0.29}TiO_3$ | 5.321 | 36.90 | 42.90 | 2.216 | 2200 | 570 |
| Comparative Example 3 | $La_{0.54}Li_{0.38}TiO_3$ | 6.973 | 36.90 | 40.64 | 0 | 400 | 570 |
| Comparative Example 4 | $La_{0.60}Li_{0.20}TiO_3$ | 3.670 | 36.90 | 45.16 | 0 | 350 | 570 |
| Comparative Example 5 | $0.95La_{0.57}Li_{0.29}TiO_3$—$0.05SrTiO_3$ | 5.055 | 36.90 | 40.76 | 0 | 2400 | 3800 |
| Comparative Example 6 | $La_{0.57}Li_{0.29}Ti_{0.95}Fe_{0.05}O_{2.95}$ | 5.321 | 35.06 | 42.90 | 0 | 2500 | 3850 |
| Comparative Example 7 | $Sr_{0.495}La_{0.05}Li_{0.36}Ti_{0.5}Ta_{0.5}O_3$ | 6.606 | 18.45 | 3.76 | 0 | 2400 | 3750 |

TABLE 2

| | Composition | Single phase ratio/% | S concentration/ppm | Conductivity/Scm$^{-1}$ |
|---|---|---|---|---|
| Example 1 | $La_{0.57}Li_{0.29}TiO_3$ | 96 | 300 | $6.0 \times 10^{-4}$ |
| Example 2 | $La_{0.55}Li_{0.35}TiO_3$ | 95 | 250 | $3.3 \times 10^{-4}$ |
| Example 3 | $La_{0.59}Li_{0.23}TiO_3$ | 92 | 400 | $3.0 \times 10^{-4}$ |
| Example 4 | $0.95La_{0.57}Li_{0.29}TiO_3$—$0.05SrTiO_3$ | 95 | 300 | $4.4 \times 10^{-4}$ |
| Example 5 | $0.85La_{0.57}Li_{0.29}TiO_3$—$0.15SrTiO_3$ | 92 | 250 | $3.6 \times 10^{-4}$ |
| Example 6 | $La_{0.57}Li_{0.29}Ti_{0.95}Fe_{0.05}O_{2.95}$ | 95 | 300 | $4.2 \times 10^{-4}$ |
| Example 7 | $La_{0.57}Li_{0.29}Ti_{0.85}Fe_{0.15}O_{2.925}$ | 92 | 200 | $3.4 \times 10^{-4}$ |
| Example 8 | $Sr_{0.495}La_{0.05}Li_{0.36}Ti_{0.5}Ta_{0.5}O_3$ | 95 | 200 | $4.1 \times 10^{-4}$ |
| Example 9 | $Sr_{0.345}La_{0.15}Li_{0.36}Ti_{0.5}Ta_{0.5}O_3$ | 93 | 200 | $3.2 \times 10^{-4}$ |
| Example 10 | $La_{0.57}Li_{0.29}TiO_3$ | 96 | 1200 | $3.3 \times 10^{-4}$ |
| Comparative Example 1 | $La_{0.57}Li_{0.29}TiO_3$ | 95 | 1700 | $1.7 \times 10^{-4}$ |
| Comparative Example 2 | $La_{0.57}Li_{0.29}TiO_3$ | 95 | 1600 | $1.9 \times 10^{-4}$ |
| Comparative Example 3 | $La_{0.54}Li_{0.38}TiO_3$ | 96 | 300 | $1.0 \times 10^{-4}$ |
| Comparative Example 4 | $La_{0.60}Li_{0.20}TiO_3$ | 90 | 400 | $1.2 \times 10^{-4}$ |
| Comparative Example 5 | $0.95La_{0.57}Li_{0.29}TiO_3$—$0.05SrTiO_3$ | 91 | 1800 | $2.3 \times 10^{-4}$ |
| Comparative Example 6 | $La_{0.57}Li_{0.29}Ti_{0.95}Fe_{0.05}O_{2.95}$ | 91 | 1700 | $1.1 \times 10^{-4}$ |
| Comparative Example 7 | $Sr_{0.495}La_{0.05}Li_{0.36}Ti_{0.5}Ta_{0.5}O_3$ | 90 | 1800 | $1.2 \times 10^{-4}$ |

In Comparative Examples 1, 2, 5 to 7 in which S concentration is more than 1500 ppm, lithium ion conductivity is less than $3.0 \times 10^{-4}$ Scm$^{-1}$. Furthermore, in spite of S concentration of 1500 ppm or less, lithium ion conductivity is less than $3.0 \times 10^{-4}$ Scm$^{-1}$ in Comparative Example 3 in which La ratio is less than 0.55 and in Comparative Example 4 in which La ratio is more than 0.59.

On the other hand, in all Examples 1 to 10 in which all of the values are within the range of the present invention, lithium ion conductivity is $3.0 \times 10^{-4}$ Scm$^{-1}$ or more. In particular, the conductivity was especially good in Examples 1, 5 and 7 in which La ratio in composition formula is 0.57 and S concentration is 300 ppm which is low value.

Furthermore, in Comparative Examples 1, 5 to 7 in which S concentration of primary dried powder (powder mixture) is more than 2000 ppm, lithium ion conductivity is less than $3.0 \times 10^{-4}$ Scm$^{-1}$. On the other hand, in all Examples 1 to 10 in which S concentration of primary dried powder (powder mixture) is 2000 ppm or less, lithium ion conductivity is $3.0 \times 10^{-4}$ Scm$^{-1}$ or more.

The present invention is promising since the lithium-lanthanum-titanium oxide sintered material can be provided, which can be used as a solid electrolyte for a lithium primary battery or a lithium secondary battery, for example, as a solid electrolyte for an all-solid lithium ion battery or a lithium air battery.

The invention claimed is:

1. Lithium-lanthanum-titanium oxide sintered material, wherein the material is described by one of general formulas $(1-a)La_xLi_{2-3x}TiO_3$-$aSrTiO_3$, $(1-a)La_xLi_{2-3x}TiO_3$-$aLa_{0.5}K_{0.5}TiO_3$, $La_xLi_{2-3x}Ti_{1-a}M_aO_{3-a}$, and $Sr_{x-1.5a}La_aLi_{1.5-2x}Ti_{0.5}Ta_{0.5}O_3$, and wherein $0.55 \leq x \leq 0.59$, $0 \leq a \leq 0.2$, M=at least one of Fe and Ga, and concentration of S is 400 ppm or less, and wherein lithium ion conductivity calculated by the following formula using an impedance analyzer in measuring frequency 5 to 13 MHz and a measuring temperature of 27° C. is $3.0 \times 10^{-4}$ Scm$^{-1}$ or more, $R_b$ ($\Omega$) being resistance inside of particle $R_{gb}$ ($\Omega$) being resistance at interface of particle, L(cm) being thickness of tabular lithium-lanthanum-titanium oxide, and S(cm$^2$) being area of electrode, Lithium ion conductivity (Scm$^{-1}$)=$1/(R_b+R_{gb}) \times (L/S)$.

2. The lithium-lanthanum-titanium oxide sintered material according to claim 1, wherein x=0.57 and a≤0.05.

3. The lithium-lanthanum-titanium oxide sintered material according to claim 1, wherein single phase ratio is 90% or more.

4. Solid electrolyte comprising the lithium-lanthanum-titanium oxide sintered material according to claim 1.

5. Lithium air battery comprising the solid electrolyte according to claim 4.

6. The lithium air battery according to claim 5 comprising an anode active material layer, solid electrolyte and a cathode active material layer, wherein electrolytic solution is contained between the anode active material layer and the solid electrolyte, and between the cathode active material layer and the solid electrolyte.

7. All-solid lithium ion battery comprising the solid electrolyte according to claim 4.

8. A method for producing the lithium-lanthanum-titanium oxide sintered material according to claim 1, the method comprising:
    a mixing process in which titanium raw material, lithium raw material, lanthanum raw material, and other metal raw material if necessary are pulverized and mixed so as to obtain a powder mixture,
    a provisional baking process in which the powder mixture obtained in the mixing process is provisionally baked so as to obtain a provisional baked body,
    a pulverizing process in which the provisional baked body in the provisional baking process is pulverized so as to obtain powder,
    a forming process in which the powder obtained in the pulverizing process is formed so as to obtain a formed body, and
    a sintering process in which the formed body obtained in the forming process is sintered,
    wherein content amount of S in the entirety of the powder mixture is 2000 ppm or less.

9. The method for producing the lithium-lanthanum-titanium oxide sintered material according to claim 8, wherein content amount of S in the titanium raw material is 3500 ppm or less.

10. The method for producing the lithium-lanthanum-titanium oxide sintered material according to claim 8, wherein the titanium raw material is titanium oxide.

11. The method for producing the lithium-lanthanum-titanium oxide sintered material according to claim 8, wherein lithium ion conductivity is $3.0 \times 10^{-4}$ Scm$^{-1}$ or more.

12. The lithium-lanthanum-titanium oxide sintered material according to claim 1, wherein 0.05≤a≤0.2.

* * * * *